(12) United States Patent
You et al.

(10) Patent No.: US 11,161,780 B2
(45) Date of Patent: Nov. 2, 2021

(54) FUNCTIONAL BUILDING MATERIAL FOR WINDOWS AND DOORS

(71) Applicant: LG Hausys, Ltd., Seoul (KR)

(72) Inventors: Hyun-Woo You, Seoul (KR); Youn-Ki Jun, Seoul (KR); Dae-Hoon Kwon, Seoul (KR); Sung-Jin Park, Seoul (KR); Eul-Doo Park, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 16/770,269

(22) PCT Filed: Dec. 5, 2018

(86) PCT No.: PCT/KR2018/015326
§ 371 (c)(1),
(2) Date: Jun. 5, 2020

(87) PCT Pub. No.: WO2019/112320
PCT Pub. Date: Jun. 13, 2019

(65) Prior Publication Data
US 2021/0163347 A1    Jun. 3, 2021

(30) Foreign Application Priority Data
Dec. 6, 2017 (KR) .......................... 10-2017-0167002

(51) Int. Cl.
*B32B 15/04* (2006.01)
*C03C 17/36* (2006.01)

(52) U.S. Cl.
CPC ........ *C03C 17/3681* (2013.01); *C03C 17/366* (2013.01); *C03C 17/3626* (2013.01); *C03C 17/3642* (2013.01); *C03C 17/3649* (2013.01)

(58) Field of Classification Search
CPC ... B32B 15/04; C03C 17/3681; C03C 17/366; C03C 17/3642
(Continued)

(56) References Cited

U.S. PATENT DOCUMENTS

| 2005/0123772 A1* | 6/2005 | Coustet | ............... C03C 17/3652 |
|---|---|---|---|
| | | | 428/432 |
| 2008/0268260 A1* | 10/2008 | Varaprasad | ........... C03C 17/366 |
| | | | 428/429 |

(Continued)

FOREIGN PATENT DOCUMENTS

| JP | 2016-41651 A | 3/2016 |
|---|---|---|
| KR | 10-2009-0099364 A | 9/2009 |

(Continued)

OTHER PUBLICATIONS

International Search Report dated Mar. 11, 2019, in connection with corresponding International Patent Application No. PCT/KR2018/015326, citing the above references.

*Primary Examiner* — Lauren R Colgan
(74) *Attorney, Agent, or Firm* — Hauptman Ham, LLP

(57) ABSTRACT

Provided is a functional building material for windows and doors, the material comprising a transparent substrate and a low-emissivity coating formed on one side of the transparent substrate, wherein: the low-emissivity coating comprises a first dielectric layer, a second dielectric layer, a lower barrier layer, a third dielectric layer, a first low-emissivity protection layer, a low-emissivity layer, a second low-emissivity protection layer, a fourth dielectric layer, a fifth dielectric layer, an upper barrier layer, and a sixth dielectric layer which are laminated in that order on the transparent substrate; the refractive index of the first dielectric layer and the refractive index of the third dielectric layer are each smaller than the refractive index of the second dielectric layer; and the refractive index of the fourth dielectric layer and the refractive index of the sixth dielectric layer are each smaller than the refractive index of the fifth dielectric layer.

7 Claims, 4 Drawing Sheets

(58) Field of Classification Search
USPC .................................................. 428/432, 434
See application file for complete search history.

(56) References Cited

U.S. PATENT DOCUMENTS

| | | | |
|---|---|---|---|
| 2011/0262726 A1* | 10/2011 | Knoll | .................. C03C 17/3626 |
| | | | 428/213 |
| 2012/0225224 A1 | 9/2012 | Blacker et al. | |
| 2012/0225317 A1* | 9/2012 | Imran | .................. C03C 17/3644 |
| | | | 428/630 |
| 2013/0216860 A1 | 8/2013 | Imran et al. | |

FOREIGN PATENT DOCUMENTS

| | | |
|---|---|---|
| KR | 10-2016-0010332 A | 1/2016 |
| KR | 10-2017-0105904 A | 9/2017 |

* cited by examiner

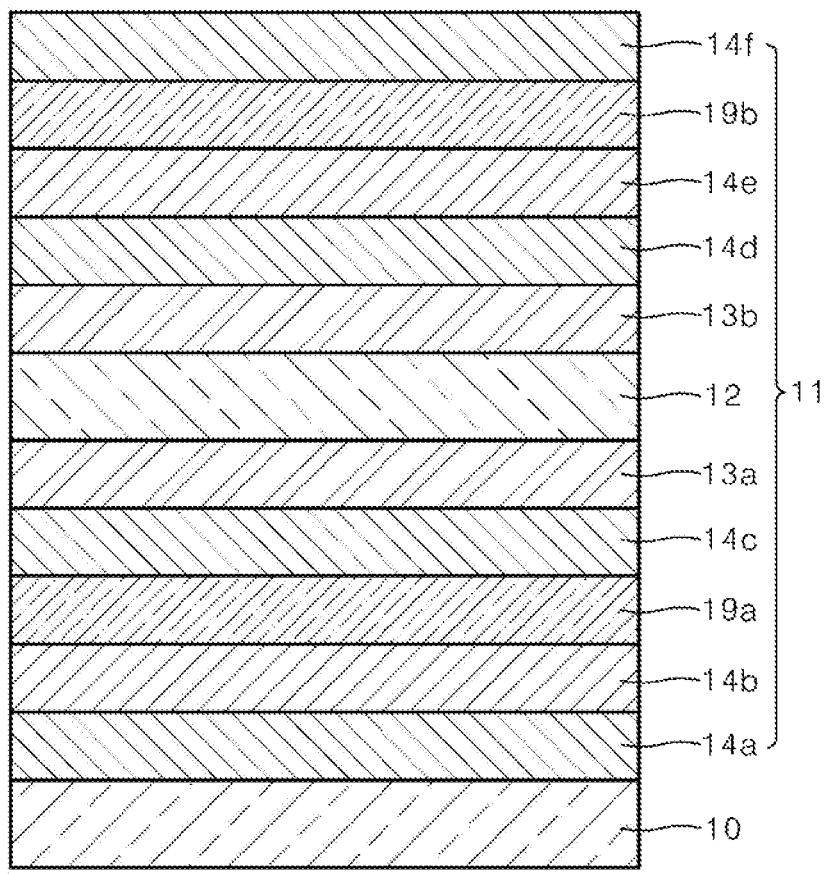
[FIG. 1]

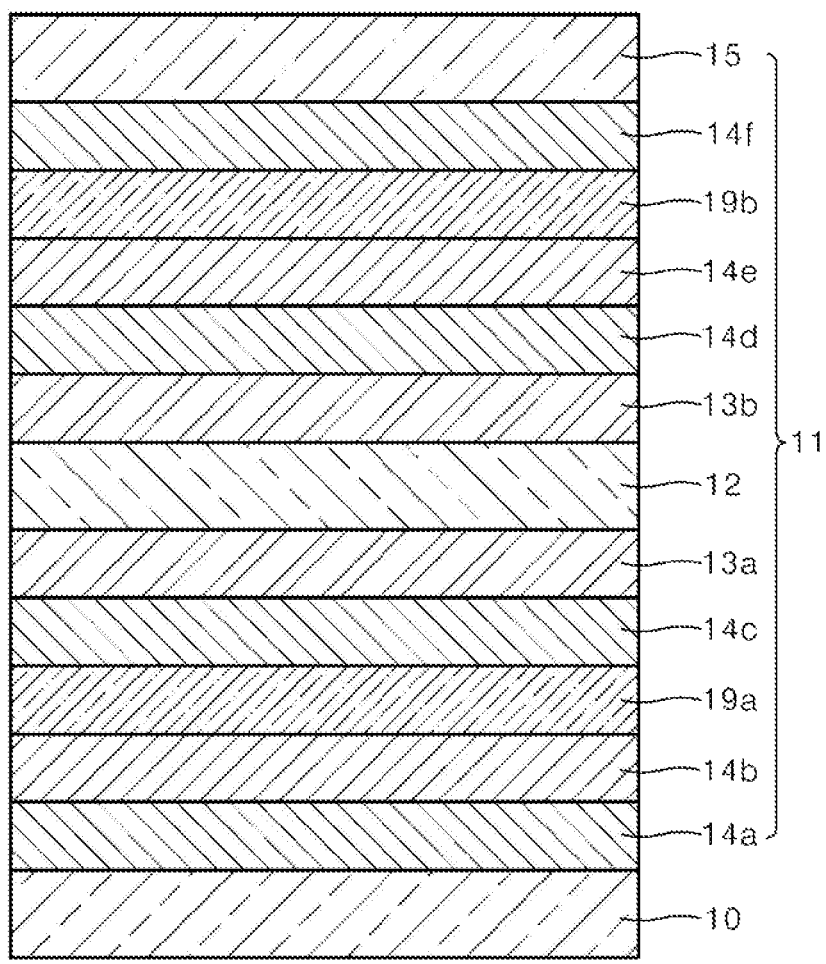
[FIG. 2]

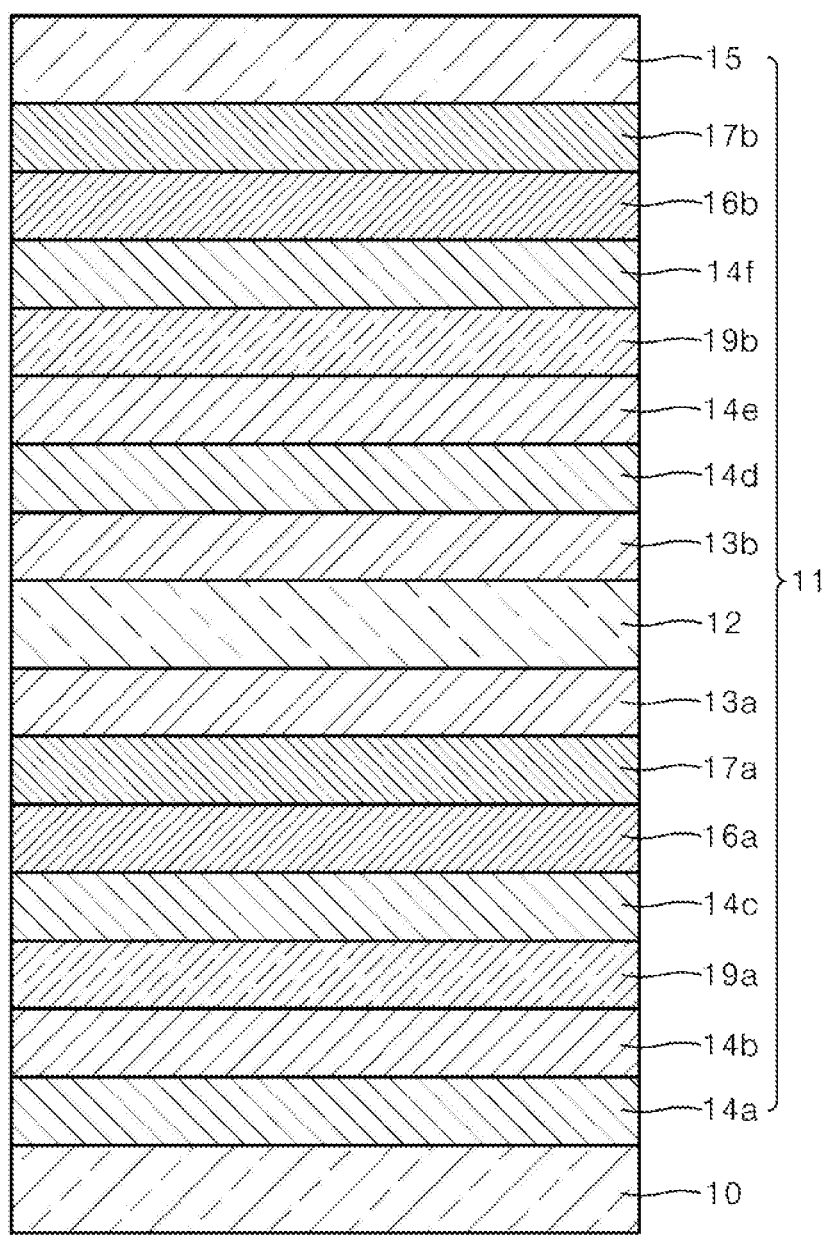
[FIG. 3]

[FIG. 4]
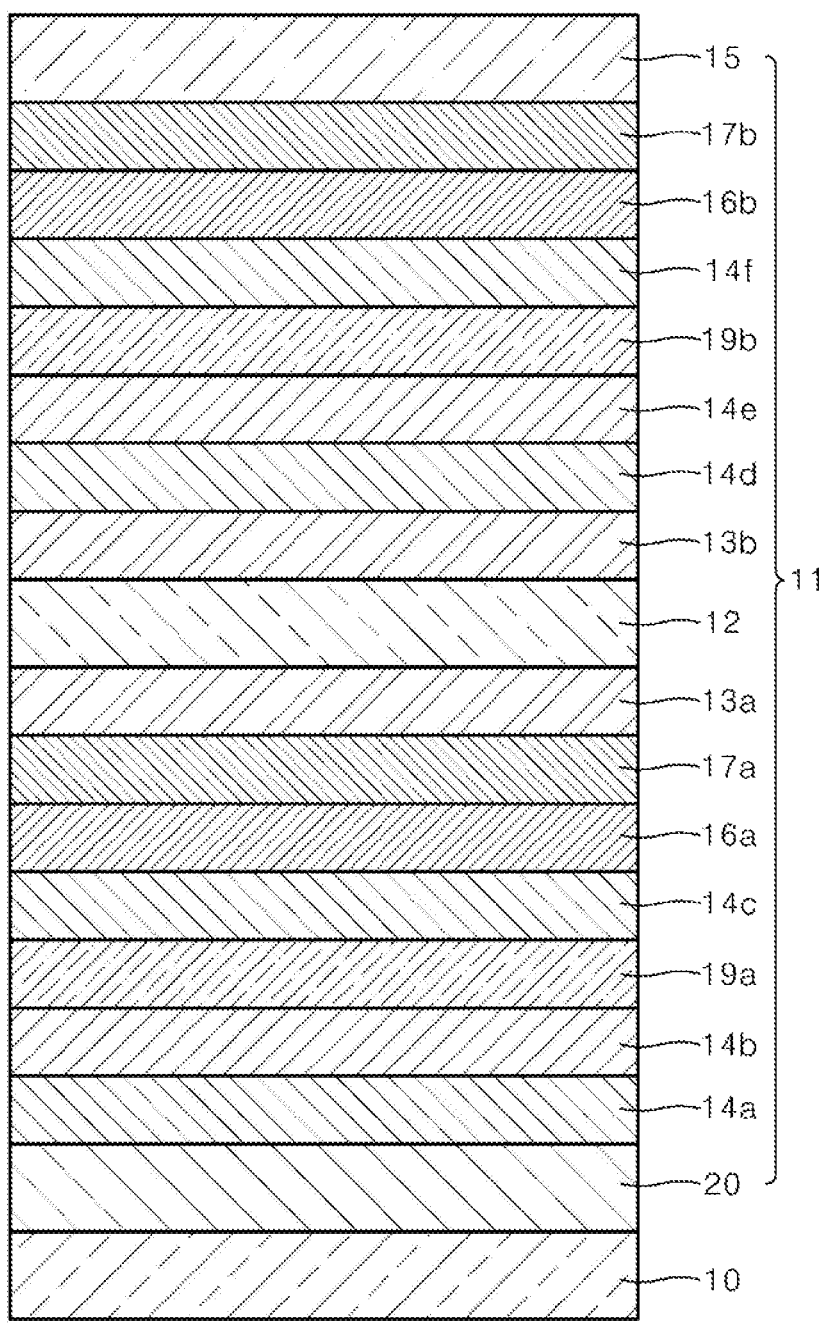

FUNCTIONAL BUILDING MATERIAL FOR WINDOWS AND DOORS

CROSS-REFERENCE TO RELATED APPLICATION

The present application is a national stage filing under 35 U.S.C § 371 of PCT application number PCT/KR2018/015326 filed on Dec. 5, 2018 which is based upon and claims the benefit of priorities to Korean Patent Application No. 10-2017-0167002, filed on Dec. 6, 2017 in the Korean Intellectual Property Office, which are incorporated herein in their entireties by reference.

TECHNICAL FIELD

The present disclosure relates to a functional building material for a window or a door.

BACKGROUND

A low-emissivity glass refers to a glass on which a low-emissivity layer containing a metal with a high reflectance in an infrared region such as silver (Ag) is deposited as a thin film. This low-emissivity glass is a functional material to reflect radiation in the infrared region, thereby blocking outdoor solar radiation in summer and to save energy of a building by preserving indoor radiant heat in winter.

In general, the silver (Ag) used for the low-emissivity layer is oxidized when exposed to air. Thus, a dielectric layer as an oxidation-preventive layer is deposited on each of top and bottom faces of the low-emissivity layer. This dielectric layer also serves to increase a visible light transmittance.

DISCLOSURE

Technical Purpose

A purpose of one implementation of the present disclosure is to provide a functional building material for a door or a window with improved durability, improved heat, moisture and abrasion resistances, while maintaining excellent optical performance.

Technical Solution

In one implementation of the present disclosure, there is provided a functional building material for a door or a window, the functional building material including a transparent substrate and a low-emissivity coating formed on one face of the transparent substrate, wherein the low-emissivity coating includes a sequential stack of a first dielectric layer, a second dielectric layer, a lower barrier layer, a third dielectric layer, a first low-emissivity protective layer, a low-emissivity layer, a second low-emissivity protective layer, a fourth dielectric layer, a fifth dielectric layer, an upper barrier layer, and a sixth dielectric layer in this order on the transparent substrate, wherein each of a refractive index of the first dielectric layer and a refractive index of the third dielectric layer is lower than a refractive index of the second dielectric layer, wherein each of a refractive index of the fourth dielectric layer and a refractive index of the sixth dielectric layer is lower than a refractive index of the fifth dielectric layer.

Each of the refractive indices of the first dielectric layer, the third dielectric layer, the fourth dielectric layer, and the sixth dielectric layer may be 2.2 or lower.

Each of the refractive indices of the second dielectric layer and the fifth dielectric layer may be 2.3 or higher.

The low-emissivity coating may further include a bottommost barrier layer contacting the transparent substrate.

The low-emissivity coating may further include a topmost protective layer on top of the sixth dielectric layer.

The low-emissivity coating may further include a sequential stack of an additional high refractive layer and an additional low refractive layer on top of the third dielectric layer and/or the sixth dielectric layer.

Technical Effect

The functional building material for the door or the window is excellent in optical performance, heat resistance, moisture resistance and abrasion resistance.

BRIEF DESCRIPTION OF DRAWINGS

FIG. 1 is a schematic cross-sectional view of a functional building material for a door or a window according to one implementation of the present disclosure.

FIG. 2 is a schematic cross-sectional view of a functional building material for a door or a window according to another implementation of the present disclosure.

FIG. 3 is a schematic cross-sectional view of a functional building material for a door or a window according to another implementation of the present disclosure.

FIG. 4 is a schematic cross-sectional view of a functional building material for a door or a window according to still another implementation of the present disclosure.

DETAILED DESCRIPTIONS

Hereinafter, exemplary embodiments of the present disclosure will be described in detail with reference to the accompanying drawings so that those skilled in the art may easily implement the present disclosure. The present disclosure may be embodied in many different forms and should not be construed as limited to the embodiments set forth herein.

In order to clarify the present disclosure, the descriptions have omitted components not related to the present disclosure. Like reference numerals designate like elements throughout the specification.

In the drawings, thickness of layers, regions, etc. are enlarged for illustrating the layers, the regions, etc. clearly. In the drawings, for convenience of illustration, thicknesses of some layers and regions are exaggerated.

As used herein, formation of a first structure above (or below) or on (or beneath) a second structure means that the first structure is formed in direct contact with a top face (or a bottom face) the second structure or means that a third structure is intervened between the first and second structures.

In one implementation of the present disclosure, a functional building material 100 for a door or a window including a transparent substrate 100 and a low-emissivity coating 11 formed on one face of the transparent substrate 10 is provided.

The low-emissivity coating 11 includes a first dielectric layer 14a, a second dielectric layer 14b, a lower barrier layer 19a, a third dielectric layer 14c, a first low-emissivity protective layer 13a, a low-emissivity layer 12, a second low-emissivity protective layer 13b, a fourth dielectric layer 14d, a fifth dielectric layer 14e, an upper barrier layer 19b, and a sixth dielectric layer 14f which are sequentially stacked on the transparent substrate 10.

Each of a refractive index of the first dielectric layer 14a and a refractive index of the third dielectric layer 14c is lower than a refractive index of the second dielectric layer 14b.

Each of a refractive index of the fourth dielectric layer 14d and a refractive index of the sixth dielectric layer 14f is lower than a refractive index of the fifth dielectric layer 14e.

FIG. 1 is a cross-sectional view of the functional building material 100 for the door or the window according to one implementation of the present disclosure.

The low-emissivity coating 11 may have a multi-layered thin film structure based on the low-emissivity layer 12 which selectively reflects a far infrared ray of solar radiation and may be formed as in FIG. 1. The low-emissivity coating 11 has excellent low-emissivity (i.e., low-e) to achieve excellent thermal insulating performance.

The low-emissivity coating 11 may be formed to have the above configuration. For example, when the coating is applied as a coated film on a window glass, the coating reflects outdoor solar radiations in summer, and saves energy of a buildings by minimizing heat transfer between indoor and outdoor and preserving indoor radiant heat in winter. Thus, the low-emissivity coating may act as a functional material.

As used herein, a term "emissivity" refers to a ratio of energy which an object absorbs, transmits and reflects to input energy at a certain wavelength. That is, as used herein, the emissivity represents a ratio of absorbed infrared energy to input infrared energy in an infrared wavelength region. Specifically, the term "emissivity" refers to a ratio of infrared energy absorbed by the object to a total applied infrared energy when a far-infrared ray corresponding to a wavelength range of about 5 µm to about 50 µm having a strong thermal action is applied.

According to Kirchhoff's law, the infrared energy absorbed by an object is equal to the infrared energy emitted by the object again. Thus, the absorbance and emissivity of the object have the same value.

Further, because the infrared energy that is not absorbed by the object is reflected from an surface of the object, the higher the reflectance of the infrared energy from the object, the lower the emissivity of the object. Numerically, this may be expressed as a relationship of (an emissivity=1−an infrared ray reflectance).

The emissivity may be measured using various methods commonly known in the art. For example, the emissivity may be measured by a facility such as a Fourier transform infrared spectroscope (FT-IR) according to a KSL2514 standard.

For an arbitrary object, for example, the low-emissivity glass, the absorbance, that is, the emissivity, of the far infrared rays exhibiting such a strong thermal action may be very important factor in measuring the heat insulating performance thereof.

When the low-emissivity coating 11 is applied as a coating film onto the transparent substrate 100, the coating maintains a predetermined transmission characteristic in a visible light region to realize good natural lighting performance and further provides an excellent thermal insulation effect by lowering the emissivity in the infrared region. Thus, the low-emissivity coating may act as a functional building material for an energy-saving window. The functional building material for the energy-saving window may be referred to as "Low-e glass".

The low-emissivity layer 12 may be embodied as a layer of electrically conductive material, such as a metal, which may have a low emissivity. That is, the low-emissivity layer has a low sheet resistance and therefore a low emissivity. For example, the low-emissivity layer 12 may have an emissivity of about 0.01 to about 0.3, specifically about 0.01 to about 0.2, more specifically about 0.01 to about 0.1, and still more specifically about 0.01 to about 0.08.

The low-emissivity layer 12 having the above defined emissivity range may simultaneously achieve excellent natural-lighting performance and thermal insulation effect by properly adjusting visible light transmittance and infrared ray emissivity. The low-emissivity layer having the above defined emissivity range may have a sheet resistance of, for example, from about 0.78 Ω/sq to about 6.42 Ω/sq. The present disclosure is not limited thereto.

The low-emissivity layer 12 selectively transmits and reflects solar radiations, and has a low-emissivity due to its high reflectivity of the solar radiation in the infrared region. The low-emissivity layer 12 may include, but is not limited to, at least one selected from a group consisting of Ag, Au, Cu, Al, Pt, ion-doped metal oxide, and combinations thereof. A material of the low-emissivity layer may include any of metals known to be capable of achieving low-emissivity performance. The ion doped metal oxide may include, for example, indium tin oxide (ITO), fluorine doped tin oxide (FTO), Al doped zinc oxide (AZO), gallium zinc oxide (GZO), and the like. In one implementation, the low-emissivity layer 12 may be embodied as a layer made of silver (Ag). As a result, the low-emissivity coating 11 may achieve a high electrical conductivity, a low absorption in a visible light range, and durability.

A thickness of the low-emissivity layer 12 may be, for example, in a range of from about 5 nm to about 25 nm. The low-emissivity layer 12 with the thickness in the above range may be suitable for simultaneously achieving the low infrared emissivity and the high visible light transmittance.

The low-emissivity protective layers 13a and 13b may be made of a metal with excellent light absorption capability to control sunlight. Controlling a material, a thickness, etc., thereof may control a color that the low-emissivity coating 11 renders.

In one implementation, each of the low-emissivity protective layers 13a and 13b may have an extinction coefficient of about 1.5 to about 3.5 in the visible light region. The extinction coefficient is a value derived from an optical constant, which is a characteristic inherent to a material. The optical constant may be expressed as n-ik. In this connection, a rear part n refers to a refractive index, and an imaginary part k refers to the extinction coefficient (referred to as absorption coefficient). The extinction coefficient is a function of a wavelength $\lambda$. For a metal, the extinction coefficient is generally greater than zero. The extinction coefficient k has a following relationship with an absorption coefficient $\alpha$: $\alpha=(4\pi k)/\lambda$. The absorption coefficient $\alpha$ has a following relationship with d as a thickness of a medium through which a light beam passes, I0 as an intensity of an output light beam from the medium and an intensity I of an input light beam to the medium: $I=I0\exp(-\alpha d)$. Thus, due to the absorption of the light beam by the medium, the intensity of the output beam is lower than the intensity of the input beam.

Each of the low-emissivity protective layers 13a and 13b may be made of a metal having the extinction coefficient in the above range in the visible light region to absorb a certain proportion of the visible light to allow the low-emissivity coating 11 to render a predetermined color.

For example, each of the low-emissivity protective layers 13a and 13b may include at least one selected from a group consisting of a metal of nickel (Ni), titanium (Ti), niobium (Nb), chromium (Cr), aluminum (Al), zinc (Zn), or molybdenum (Mo), a composite metal containing at least two of the metals, an oxide of the metal, an oxide of the metal composite, and combinations thereof and may not be limited thereto. The composite metal means an alloy form.

In FIG. 1, each of the low-emissivity protective layer 13a and the low-emissivity protective layer 13b is shown as being formed of a single layer. However, each of the low-emissivity protective layer 13a and the low-emissivity protective layer 13b may be formed of a stack of multiple layers.

In one implementation, each of the low-emissivity protective layers 13a and 13b may include Ti, Nb, Mo or an alloy of at least two thereof.

Each of the low-emissivity protective layers 13a and 13b may be embodied as a single layer or a stack of a plurality of layers. The low-emissivity protective layer may be disposed on top and/or bottom faces of the low-emissivity layer. As shown in FIG. 1, the low-emissivity protective layers 13a and 13b may sandwich the low-emissivity layer 12 therebetween.

A thickness of each of the low-emissivity protective layers 13 and 13b may be, for example, in a range of from about 0.5 nm to about 5 nm. The present disclosure is not limited thereto. The thickness may vary suitably according to a purpose of the window.

The thickness of each of the low-emissivity protective layers 13a and 13b may vary depending on the metal material. For example, a thickness of a NiCr layer as each of the low-emissivity protective layers 13a and 13b may be about 0.5 nm to about 2 nm. A thickness of a ZnAlOx layer as each of the low-emissivity protective layers 13a and 13b may be about 1 nm to about 8 nm.

When the low-emissivity coating 11 has the low-emissivity protective layers 13a and 13b in the above thickness range, the coating 11 may adjust a transmittance and a reflectance thereof to a predetermined transmittance and a predetermined reflectance respectively while performing a function executed by the low-emissivity protective layers 13a and 13b.

Each of refractive indexes of the first dielectric layer 14a, the third dielectric layer 14c, the fourth dielectric layer 14d, and the sixth dielectric layer 14f may be about 2.2 or lower, and specifically, about 1.8 to about 2.2.

In one implementation, each of the first dielectric layer 14a, the third dielectric layer 14c, the fourth dielectric layer 14d and the sixth dielectric layer 14f may include silicon aluminum nitride.

The silicon aluminum nitride may achieve a refractive index lower than or equal to about 2.2, and at the same time, may exhibit excellent durability.

Each of the first dielectric layer 14a, the third dielectric layer 14c, the fourth dielectric layer 14d and the sixth dielectric layer 14f may be formed by deposition of, for example, a target having a weight ratio of Si:Al of about 85 to 95 parts by weight:5 to 15 parts by weight using sputtering equipment in a nitrogen atmosphere. In this connection, the refractive index may be adjusted according to a nitrogen content. Specifically, the smaller the nitrogen content, the lower the refractive index. The higher the nitrogen content, the higher the refractive index. Specifically, adjusting the content of the nitrogen may allow producing a silicon aluminum nitride layer having the refractive index of about 1.8 to about 2.2.

The functional building material 100 for the door or the window has at least 4 layers made of silicon aluminum nitride and thus may exhibit excellent durability.

Each of the refractive indexes of the second dielectric layer 14b and the fifth dielectric layer 14e may be about 2.3 or greater, specifically, about 2.3 to about 2.5.

In another implementation, each of the second dielectric layer 14b and the fifth dielectric layer 14e may include oxide, oxynitride or both of one selected from a group consisting of Ti, Zr, Nb, Ta, and combinations thereof. The combination of Ti, Zr, Nb and Ta means an alloy of two or more metals thereof.

Specifically, each of the second dielectric layer 14b and fifth dielectric layer may include oxide of one selected from a group consisting of titanium, zirconium, tantalum, and combinations thereof. Specifically, each of the second dielectric layer 14b and fifth dielectric layer 14e may include oxide of one selected from a group consisting of TiOx; ZrOx; TaOx; and alloys of at least two of Ti, Zr, and Ta, where $1.5 \leq x \leq 2.0$, specifically, about $1.6 \leq x \leq 1.9$.

The above exemplified materials may reliably achieve refractive indices greater than or equal to about 2.3 and, at the same time, may exhibit excellent durability.

Since the metal used for the low-emissivity layer 12 is generally well oxidized, the first dielectric layer 14a to the sixth dielectric layer 14f may act as an antioxidant layer for the low-emissivity layer 12. Further, the first dielectric layer 14a to the sixth dielectric layer 14f may serve to increase visible light transmittance. Further, the first dielectric layer 14a to the sixth dielectric layer 14f may improve the optical performance of the low-emissivity coating 11.

A thicknesses of each of the first dielectric layer 14a to the sixth dielectric layer 14f may be adjusted to implement various optical performances. Specifically, the thickness of each of the dielectric layers may be about 5 nm to about 30 nm. A sum of the thicknesses of the first dielectric layer 14a to the sixth dielectric layer 14f may be about 30 nm to about 120 nm.

In the low-emissivity coating 11, each of a stack of the first dielectric layer 14a to the third dielectric layer 14c and a stack of the fourth dielectric layer 14d to the sixth dielectric layer 14f may form a stack of a low refractive layer, a high refractive layer, and a low refractive layer. Thus, forming a structure where the low refractive index layer and the high refractive layer are repeatedly and alternately stacked may allow the optical performance required in the low-emissivity glass such as transmittance, reflectance, color index, etc. to be greatly improved.

The low-emissivity coating 11 includes a multi-layer barrier including the upper barrier layer 19b and the lower barrier layer 19a. When the upper barrier layer 19b and the lower barrier layer 19a are disposed at specific locations as shown in FIG. 1, the multi-layer barrier may effectively prevent oxygen and moisture diffusion. Further, the functional building material 10 for the window or the door having the multilayer barrier may have improved heat resistance, improved moisture resistance, and improved wear resistance while does not deteriorating optical performance thereof.

During a process of forming the low-emissivity coating 11 on one face of the transparent substrate 10 to produce the functional building material 10 for windows and doors, a heat treatment process may be performed to apply prestress the low-emissivity coating 11 via a bending or strengthening process. The heat treatment process may be performed by heating the low-emissivity coating 11 to a temperature of about 600 to about 700° C. During the heat treatment, the materials forming the low-emissivity coating 11 may be subjected to oxidation, diffusion, or agglomeration, and thus the coating 11 may undergo structural deformation. Further, when the low-emissivity coating 11 is present in a high temperature and high humidity environment, and the low-emissivity layer 120 contacts components that may act as a corrosive agent such as oxygen, chloride, sulfide, and sulfur dioxide in an atmosphere, corrosion of the low-emissivity coating 11 occurs and thus the coating film may be damaged. Further, during transportation or handling of the functional building material 10 for windows or doors, the low-emissivity coating 11 is frequently damaged by scratches.

Accordingly, there is a need to protect the low-emissivity coating 11 from the heat treatment process, from the high temperature and high humidity surrounding environment, or from the physical damage during the transportation or handling of the functional building material 10.

When the functional building material 10 for windows and doors has the structure of the multilayer barrier as described above, the lower barrier layer 19a and the upper barrier layer 19b may prevent physical and chemical diffusion of alkali ions and oxygen. Accordingly, the lower barrier layer 19a and the upper barrier layer 19b may function to protect the low-emissivity coating 11 from the heat treatment process and high temperature and high humidity environment as above-described. Further, the bottommost barrier layer 20 improves interfacial adhesion between the glass substrate 100 and the low-emissivity coating 11, thereby improving wear resistance of the low-emissivity coating 11.

Therefore, the functional building material 10 for the window or the door having the multilayer barrier may be excellent in heat resistance, moisture resistance and wear resistance.

Each of the lower barrier layer 19a and the upper barrier layer 19b may include one selected from a group consisting of a metal, a composite metal, a nitride of the metal, a nitride of the composite metal, and combinations thereof.

The metal may include Si, Zr, Ti, Nb, Ni or Cr. The composite metal may mean an alloy containing at least two types of the metals. The composite metal may be, for example, SiAl, ZrSi, TiZr, NiCr, NiTi, NbZr or NiTiNb. SiAl means an alloy of Si and Al. This definition may be equally to other alloys unless otherwise specified herein.

In another embodiment, each of the lower barrier layer 19a and the upper barrier layer 19b may include one selected from a group consisting of zirconium nitride, zirconium silicon nitride, titanium nitride, titanium zirconium nitride, niobium nitride, nickel nitride, chromium nitride, nickel chromium nitride, nickel titanium nitride, niobium zirconium nitride, nickel titanium niobium nitride, and combinations thereof.

In the functional building material 100 for the door or the window, the low-emissivity coating 11 may further include a topmost protective layer 15 on a top of the sixth dielectric layer 14f.

FIG. 2 shows a cross-sectional view of a functional building material 200 for a door or a window according to another implementation of the present disclosure.

The functional building material 200 for the door or the window has an uppermost protective layer 15 on a top of the sixth dielectric layer 14f in addition to the above-described structure.

The topmost protective layer 15 may be exposed outwardly, and may include a zirconium-based compound.

Specifically, the topmost protective layer 15 may include zinc aluminum oxide.

The topmost protective layer 15 may achieve excellent optical performance together with the first dielectric layer 14a to the sixth dielectric layer 14f.

The low-emissivity coating 11 may further include a pair of an additional high refractive layer of a refractive index of at least about 2.3, specifically, about 2.3 to about 2.5 corresponding to the first dielectric layer 14a, the second dielectric layer 14b and the fifth dielectric layer 14e, and an additional low refractive layer of a refractive index of about 2.2 or lower, specifically about 1.8 to about 2.2 corresponding to the third dielectric layer 14c, the fourth dielectric layer 14d, and the sixth dielectric layer 14f.

The additional high refractive layer and the additional low refractive layer may be paired so that a stack of the additional high refractive layer and the additional low refractive layer may be stacked on the third dielectric layer 14c and/or on the sixth dielectric layer 14f.

Further, the additional high refractive layer and the additional low refractive layer may be paired such that a first stack of the additional high refractive layer and the additional low refractive layer and a second stack of the additional high refractive layer and the additional low refractive layer stacked on the first stack may be stacked on the third dielectric layer 14c and/or on the sixth dielectric layer 14f.

That is, the pair of the additional high refractive layer and the additional low refractive layer may be disposed between the third dielectric layer 14c and the first low-emissivity protective layer 13a, on top of the sixth dielectric layer 14f, or between the sixth dielectric layer 14f and the topmost protective layer 15.

As the pairs of the additional high refractive layers and the additional low refractive layers are repeatedly stacked, the optical performance such as transmittance is improved. However, a product cost may increase. Thus, the number of the pairs as stacked may be adjusted according to applications.

FIG. 3 shows a functional building material 300 for a door or window including the pair of the additional high refractive layer and the additional low refractive layer.

In FIG. 3, the functional building material 300 for the door or the window may include one pair of the additional high refractive layer 16a and the additional low refractive layer 17a and the other pair of the additional high refractive layer 16b and the additional low refractive layer 17b.

The low-emissivity coating 11 may further include the bottommost barrier layer 20 contacting the transparent substrate.

FIG. 4 is a cross-sectional view showing a functional building material 400 for windows and doors according to still another implementation according to the present disclosure.

In FIG. 4, it is shown that the bottommost barrier layer 20 is further included in the stack structure of FIG. 3. However, the present disclosure is not limited thereto. The functional building material for windows and doors may further include the bottommost barrier layer 20 in each of the stack structures of FIG. 1 and FIG. 2.

The bottommost barrier layer 20 may include one selected from a group consisting of a metal of Si, Zr or Ti, a composite metal containing at least two of the metals, an oxide of the metal, an oxynitride of the metal, an oxide of the composite metal, an oxynitride of the composite metal, and combinations thereof. Specifically, the composite metal of the bottommost barrier layer 20 may be SiAl, ZrSi, or TiZr.

In one embodiment, the bottommost barrier layer 20 may include one selected from a group consisting of silicon oxide, silicon aluminum oxide, zirconium oxide, zirconium silicon oxide, titanium oxide, titanium zirconium oxide, silicon oxynitride, silicon aluminum oxynitride, zirconium oxynitride, zirconium silicon oxynitride, titanium oxynitride, titanium zirconium oxynitride, and combinations thereof.

The low-emissivity coating 11 may further include additional layers other than the layers of the above-described structure in order to realize predetermined optical performance.

The transparent substrate 10 may be embodied as a transparent substrate having a high visible light transmittance. For example, the substrate may be embodied as a glass or transparent plastic substrate having a visible light transmittance of about 80% to about 100%. In one example, the transparent glass substrate may be embodied, without limitation, as any glass used for a construction purpose. For example, a thickness of the substrate may be in a range of from about 2 mm to about 12 mm. The thickness may vary depending on the purpose and function of the window. The present disclosure is not limited thereto.

In order to manufacture the functional building material for the window or the door, first, the transparent substrate 10 may be prepared, and then layers constituting the low-emissivity coating 11 may be sequentially formed on the substrate. Each of the layers constituting the low-emissivity coating 11 may be formed using a known method or using a method suitable for realizing a desired physical property.

Examples and Comparative Examples in the present disclosure are described below. The Examples below are only an example of the present disclosure. Thus, the present disclosure is not limited to the Examples below.

EXAMPLES

Example 1

Using a magnetron sputter deposition apparatus, the low-emissivity coating having a multi-layer structure coated on the transparent glass substrate was prepared as follows.

Silicon aluminum nitride constituting the first dielectric layer was deposited on a 5 mm thick transparent glass substrate under an argon/nitrogen atmosphere. Subsequently, titanium oxide constituting the second dielectric layer was deposited under an argon/oxygen atmosphere. Then, a nickel-chromium layer as the lower barrier layer was formed under an argon atmosphere, and, then, a silicon aluminum layer as the third dielectric layer was formed thereon under an argon/nitrogen atmosphere. Thereafter, an aluminum zinc oxide layer was formed thereon under an argon/oxygen atmosphere, and a nickel chromium layer was formed thereon under an argon 100% atmosphere to form the first low-emissivity protective layer. Next, a silver layer was deposited to form the low-emissivity layer. On top of the low-emissivity layer, a nickel chromium layer was formed under 100% argon atmosphere and then an aluminum zinc oxide layer was formed under an argon/oxygen atmosphere to form the second low-emissivity protective layer. Thereafter, the fourth dielectric layer made of silicon aluminum nitride was deposited thereon under an argon/nitrogen atmosphere. Subsequently, a nickel-chromium layer as the upper barrier layer was formed thereon under an argon atmosphere. Subsequently, the fifth dielectric layer made of titanium oxide was formed thereon under an argon/oxygen atmosphere. Finally, the sixth dielectric layer made of silicon aluminum nitride was formed thereon under an argon/nitrogen atmosphere.

Comparative Example 1

The low-emissivity coating was produced in the same manner as in the above Example 1 except for the second dielectric layer and the fifth dielectric layer as the titanium oxide layer and the upper and lower barrier layers as the nickel-chromium layer in the above Example 1.

Experimental Example 1

Performance analysis was performed on the functional building material for the door or the window manufactured in Example 1 based on each of following items.

<Transmittance Calculation>

We measured an optical spectrum on a 1 nm width basis in a range of 250 to 2500 nm using an UV-Vis-NIR spectrum measuring device (Shimadzu, Solidspec-3700), and then used the measured result to calculate a visible light transmittance based on a KS L 2514 standard.

<Emissivity>

An far-infrared reflectance spectrum of one face of the low-emissivity coating of the functional building material for the door or the window was measured using FT-IR (Frontier and Perkin Elmer) as a far-infrared spectroscopy device. An average infrared reflectance was calculated from the measured result based on a KS 2514 standard, and then an emissivity was evaluated using a formula of 100%−(far infrared average reflectance).

<Color Index>

L*, a*, and b* values of a CIE1931 standard were measured using a color difference meter (KONICA MINOLTA SENSING, Inc., CM-700d). In this connection, a light source employed a D65 of a KS standard.

The results evaluated as above are as follows.

TABLE 1

| | | | Color index | | | | | |
|---|---|---|---|---|---|---|---|---|
| | | | Transmissive | | Reflection of face of low-emissivity coating | | Reflection of face of transparent substrate | |
| Examples | Transmittance (%) | Emissivity (%) | a* | b* | a* | b* | a* | b* |
| Example 1 | 78.6 | 4.8 | −3.0 | 3.6 | 2.9 | −12.1 | 0.8 | −8.5 |
| Comparative Example 1 | 74.5 | 4.8 | −3.2 | 5.4 | 3.8 | −11.4 | 2.0 | −9.5 |

Typically, a factor affecting the emissivity is the Ag layer. Thus, as a thickness of the Ag layer increases, the emissivity decreases, but the transmittance decreases. However, to achieve a neutral color, high transmittance and low emissivity must be realized simultaneously.

building material for the door or the window prepared according to each of Example 1 and Comparative Example 1.

The results of the Experimental Examples 2 to 4 are shown in Table 2 below.

TABLE 2

| Examples | Wear Resistance: cleaning device (scratch occurrence timing) | Storage Performance: moisture resistance chamber, 50° C., 90% RH (humidity) (corrosion occurrence timing) | Storage Performance: moisture resistance chamber, 95° C., 90% RH (humidity) (corrosion occurrence timing) |
|---|---|---|---|
| Example 1 | 15 mins | 14 days | 10 days |
| Comparative Example 1 | 10 mins | 10 days | 5 days |

Further, an important factor related to the optical performance in a residential low-e glass may be high transmittance in the same color to achieve the neutral color.

From the results of the Table 1, it may be seen that Example 1 exhibits a similar level of each of the color index and emissivity to that in Comparative Example 1, but, at the same time, exhibits improved transmittance. Therefore, Example 1 may implement the neutral color more reliably and have improved optical performance compared to Comparative Example 1.

Experimental Example 2

Evaluation of Wear Resistance

For the functional building material for the door or the window prepared according to each of Example 1 and Comparative Example 1, a wear resistance test was performed using a cleaning machine (MANNA, MGR-460). Accordingly, a time when a scratch occurred on a surface of each low-emissivity coating was visually measured.

Experimental Example 3

Evaluation of Moisture Resistance—50° C., 90% RH (Humidity)

The functional building material for the door or the window prepared according to each of Example 1 and Comparative Example 1 was left in a constant temperature and constant humidity chamber (LS Industrial Systems Co., Ltd., EBS-35B) at a condition of 50° C. and 90% RH (humidity). A time point corresponding to occurrence of corrosion was evaluated. We used an optical microscope ×50 to identify whether the corrosion occurs in the functional building material for the door or the window prepared according to each of Example 1 and Comparative Example 1.

Experimental Example 4

Evaluation of Moisture Resistance—95° C., 90% RH (Humidity)

The functional building material for the door or the window prepared according to each of Example 1 and Comparative Example 1 was left in a constant temperature and constant humidity chamber (LS Industrial Systems Co., Ltd., EBS-35B) at a condition of 95° C. and 90% RH (humidity). A time point corresponding to occurrence of corrosion was evaluated. We used an optical microscope ×50 to identify whether the corrosion occurs in the functional It may be identified from the results of Table 2 that the Example 1 exhibits superior abrasion resistance compared to the Comparative Example 1, and at the same time, exhibits improved moisture resistance compared to the Comparative Example 1. This result may be due to the fact that the upper and lower barrier layers of the Example 1 improve the durability.

Therefore, it may be identified that the Example 1 has superior wear resistance and improved moisture resistance, and improved overall durability, compared to the Comparative Example 1.

Although the above detailed Examples of the present disclosure are illustrated in detail, the scope of the present disclosure is not limited thereto. Many variations and modifications by the skilled person using the basic concepts of the present disclosure as defined in the following claims are within the scope of the rights of the present disclosure.

REFERENCE NUMERALS

10: Transparent substrate
11: Low-emissivity coating
12: Low-emissivity layer
13a, 13b: Low-emissivity protective layers
14a, 14b, 14c, 14d, 14e, 14f: Dielectric layers
15: Topmost protective layer
16a, 16b: Additional high refractive layer
17a, 17b: Additional low refractive layer
19a: Lower barrier layer
19b: Upper barrier layer
20: Bottommost barrier layer
100, 200, 300, 400: Functional building material for door or window

What is claimed is:

1. A functional building material for a door or a window, the functional building material including a transparent substrate and a low-emissivity coating formed on one face of the transparent substrate,
wherein the low-emissivity coating includes a sequential stack of a bottommost barrier layer, a first dielectric layer, a second dielectric layer, a lower barrier layer, a third dielectric layer, a first low-emissivity protective layer, a low-emissivity layer, a second low-emissivity protective layer, a fourth dielectric layer, a fifth dielectric layer, an upper barrier layer, and a sixth dielectric layer in this order on the transparent substrate,
wherein the bottommost barrier layer is in contact with the transparent substrate,
wherein the bottommost barrier layer comprises a metal selected from the group consisting of Si and Zr, a composite metal of the metals, an oxide of the metal, an oxynitride of the metal, an oxide of the composite metal, an oxynitride of the composite metal, or combinations thereof, wherein a refractive index of each of the first dielectric layer, the third dielectric layer, the fourth dielectric layer, and the sixth dielectric layer ranges from 1.8 to 2.2, wherein a refractive index of each of the second dielectric layer and the fifth dielectric layer ranges from 2.3 to 2.5, wherein each of the first dielectric layer, the third dielectric layer, the fourth dielectric layer, and the sixth dielectric layer comprises silicon aluminum nitride, and wherein each of the second dielectric layer and the fifth dielectric layer comprises titanium oxide.

2. The functional building material of claim 1, wherein each of the lower barrier layer and the upper barrier layer includes one selected from a group consisting a metal of Si, Zr, Ti, Nb, Ni, or Cr, a composite metal containing at least two of the metals, a nitride of the metal, a nitride of the composite metal, and combinations thereof.

3. The functional building material of claim 1, wherein the functional building material further includes a sequential stack of an additional high refractive layer and an additional low refractive layer on top of the third dielectric layer and/or the sixth dielectric layer, wherein the additional low refractive layer has a refractive index of 2.2 or lower, wherein the additional high refractive layer has a refractive index of 2.3 or higher.

4. The functional building material of claim 1, wherein the low-emissivity coating further includes a topmost protective layer on top of the sixth dielectric layer, wherein the topmost protective layer includes a zirconium-based compound.

5. The functional building material of claim 1, wherein the low-emissivity layer has an emissivity of 0.01 to 0.3.

6. The functional building material of claim 1, wherein each of the first low-emissivity protective layer and the second low-emissivity protective layer has an extinction coefficient of 1.5 to 3.5 in a visible ray region.

7. The functional building material of claim 1, wherein the transparent substrate is a glass or transparent plastic substrate having a visible light transmittance of 80% to 100%.

* * * * *